(12) United States Patent
Tucker et al.

(10) Patent No.: US 7,281,880 B2
(45) Date of Patent: Oct. 16, 2007

(54) SUBSEA VEHICLE ASSISTED PIPELINE COMMISSIONING METHOD

(75) Inventors: David M. Tucker, Katy, TX (US); Charles R. Yemington, Arlington, TX (US)

(73) Assignee: Valkyrie Commissioning Services, Houston, TX (US)

( * ) Notice: Subject to any disclaimer, the term of this patent is extended or adjusted under 35 U.S.C. 154(b) by 185 days.

(21) Appl. No.: 10/365,832

(22) Filed: Feb. 13, 2003

(65) Prior Publication Data

US 2003/0154769 A1 Aug. 21, 2003

Related U.S. Application Data

(62) Division of application No. 09/892,314, filed on Jun. 26, 2001, now Pat. No. 6,539,778.

(60) Provisional application No. 60/275,215, filed on Mar. 13, 2001.

(51) Int. Cl.
*B63B 35/00* (2006.01)
(52) U.S. Cl. .................................. 405/154.1
(58) Field of Classification Search ................ 73/49.5; 405/191, 158, 154.1
See application file for complete search history.

(56) References Cited

U.S. PATENT DOCUMENTS

| | | | |
|---|---|---|---|
| 3,640,299 A | * | 2/1972 | Nelson ........................... 137/1 |
| 3,708,990 A | | 1/1973 | Crooke |
| 3,777,499 A | * | 12/1973 | Matthews, Jr. .............. 405/173 |
| 3,961,493 A | * | 6/1976 | Nolan et al. ................. 405/158 |
| 4,229,121 A | | 10/1980 | Brown |
| 4,234,268 A | * | 11/1980 | Scodino ...................... 405/158 |
| 4,332,277 A | | 6/1982 | Adkins et al. |
| 4,344,319 A | | 8/1982 | Hancock et al. |
| 4,463,597 A | | 8/1984 | Pierce et al. |

(Continued)

FOREIGN PATENT DOCUMENTS

GB 2195739 4/1988

(Continued)

OTHER PUBLICATIONS

Graves, Syd. "Vessel-Free Flooding of Deep Water Pipelines Using the Copipe SPU." The Deepwater Pipeline Technology Conference, New Orleans, LA, Mar. 9-11, 1998.

(Continued)

*Primary Examiner*—Hezron Williams
*Assistant Examiner*—John Fitzgerald
(74) *Attorney, Agent, or Firm*—Wong, Cabello, Lutsch, Rutherford & Brucculeri, LLP

(57) ABSTRACT

The present invention is directed to a method for completing the commissioning of a subsea pipeline by purging with a compressed gas to dewater and dry the line wherein the operation is done on the seabed. More specifically, the method is carried out with a subsea vechicle (hereinafter "SV") that powers pumps located on the seabed or are carried by the SV to inject/remove chemical, dewater, and dry the pipeline. The present invention may be part of the commissioning of a new or old pipeline or a new portion of a pipeline in which a purging of the line with a compressed gas and drying of the line is required. After commissioning, product flows through the pipeline.

9 Claims, 15 Drawing Sheets

U.S. PATENT DOCUMENTS

| | | | | |
|---|---|---|---|---|
| 4,906,136 | A | * | 3/1990 | Norbom et al. ............. 405/169 |
| 5,044,827 | A | * | 9/1991 | Gray et al. ................. 405/173 |
| 5,192,167 | A | | 3/1993 | da Silva et al. |
| 5,267,616 | A | | 12/1993 | Silva et al. |
| 5,273,376 | A | * | 12/1993 | Ritter, Jr. ................... 405/169 |
| 5,421,674 | A | | 6/1995 | Maloberti et al. |
| 5,842,816 | A | | 12/1998 | Cunningham |
| 5,883,303 | A | | 3/1999 | Bliss et al. |
| 5,927,901 | A | * | 7/1999 | Graves ....................... 405/158 |
| 5,975,803 | A | | 11/1999 | Mackinnon |
| 6,022,421 | A | * | 2/2000 | Bath et al. .................... 134/8 |
| 6,109,829 | A | | 8/2000 | Cruickshank |
| 6,145,223 | A | * | 11/2000 | Flesen ......................... 37/317 |
| 6,170,493 | B1 | | 1/2001 | Sivacoe |
| 6,200,068 | B1 | | 3/2001 | Bath et al. |
| 6,234,717 | B1 | | 5/2001 | Corbetta |
| 6,290,431 | B1 | | 9/2001 | Exley et al. |
| 6,336,238 | B1 | | 1/2002 | Tarlton |
| 6,454,492 | B1 | * | 9/2002 | Dean et al. ................. 405/158 |
| 6,503,021 | B2 | | 1/2003 | Corbetta |
| 6,549,857 | B2 | | 4/2003 | Fierro et al. |
| 2002/0040872 | A1 | | 4/2002 | Rytlewski et al. |
| 2002/0059887 | A1 | | 5/2002 | Smith et al. |
| 2003/0145991 | A1 | | 8/2003 | Olsen |
| 2003/0170077 | A1 | * | 9/2003 | Herd et al. ............. 405/224.2 |

FOREIGN PATENT DOCUMENTS

| | | |
|---|---|---|
| JP | 406226185 | 8/1994 |
| WO | 02084160 | 10/2002 |
| WO | WO 02/084160 A1 | 10/2002 |
| WO | 02088658 | 11/2002 |

OTHER PUBLICATIONS

Graves, Les. "Deepwater Pipeline Flooding and Pigging Without Connection to a Surface Vessel." Transactions: Institure of Marine Engineers, Series C, 1999. V. 111, No. 1, pp. 151-160.

NACE International,. "Public Affairs-White Papers." http://www.nace.org/nace/content/publicaffairs/media/pirns.asp.

Battelle. "Energy & Environment: Determining Benefits of Hydrotesting." http://www.battelle.org/environment/hydrotesting.stm.

"Hydrostatic Test." http://en.wikipedia.org/wiki/hydrostatic_test.

Graves, Syd; "Vessel-free flooding of deepwater pipelines using the Copipe SPU", The Deepwater Pipeline Technology Conference, New Orleans, LA Mar. 9-11, 1998; 15 pages.

* cited by examiner

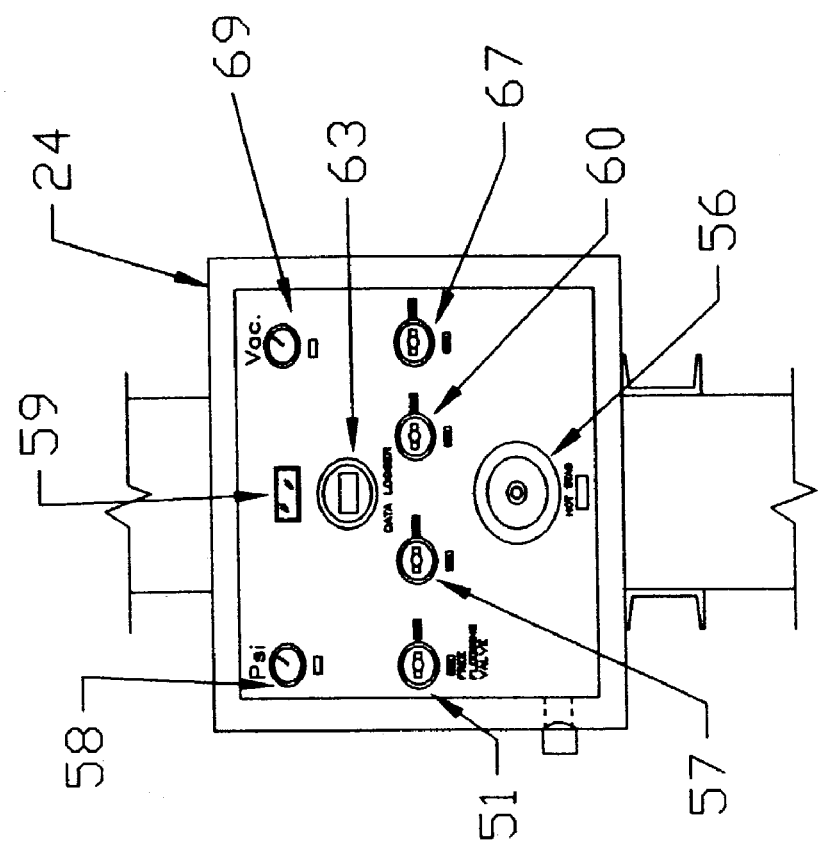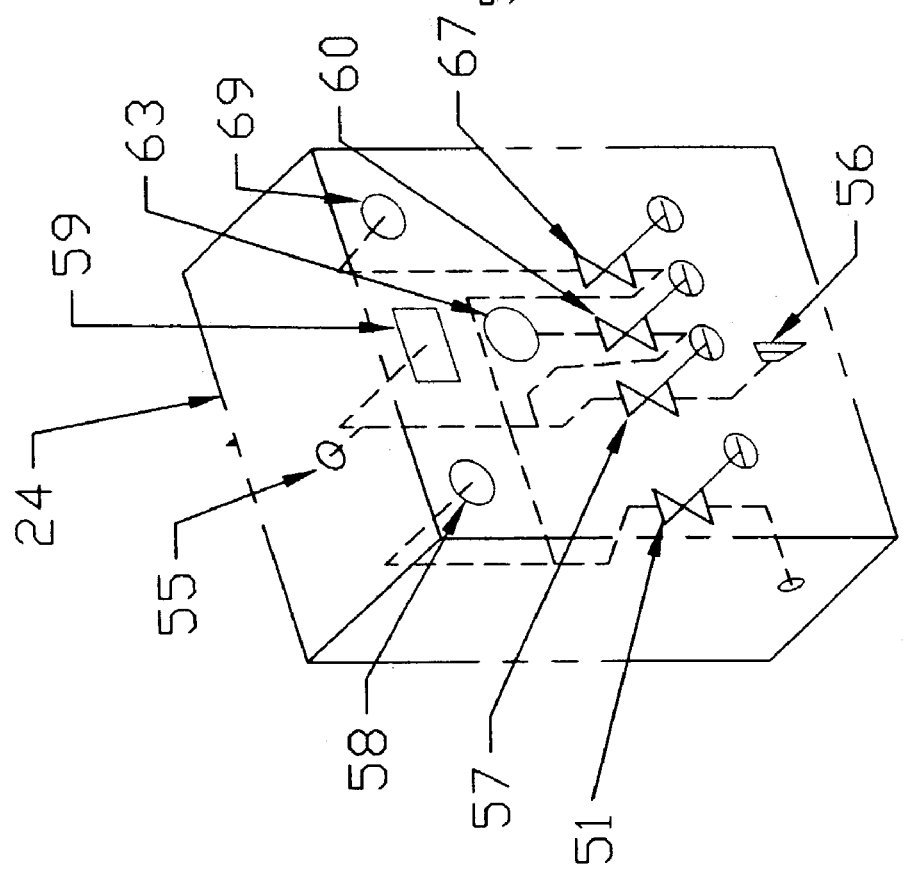
FIG. 3

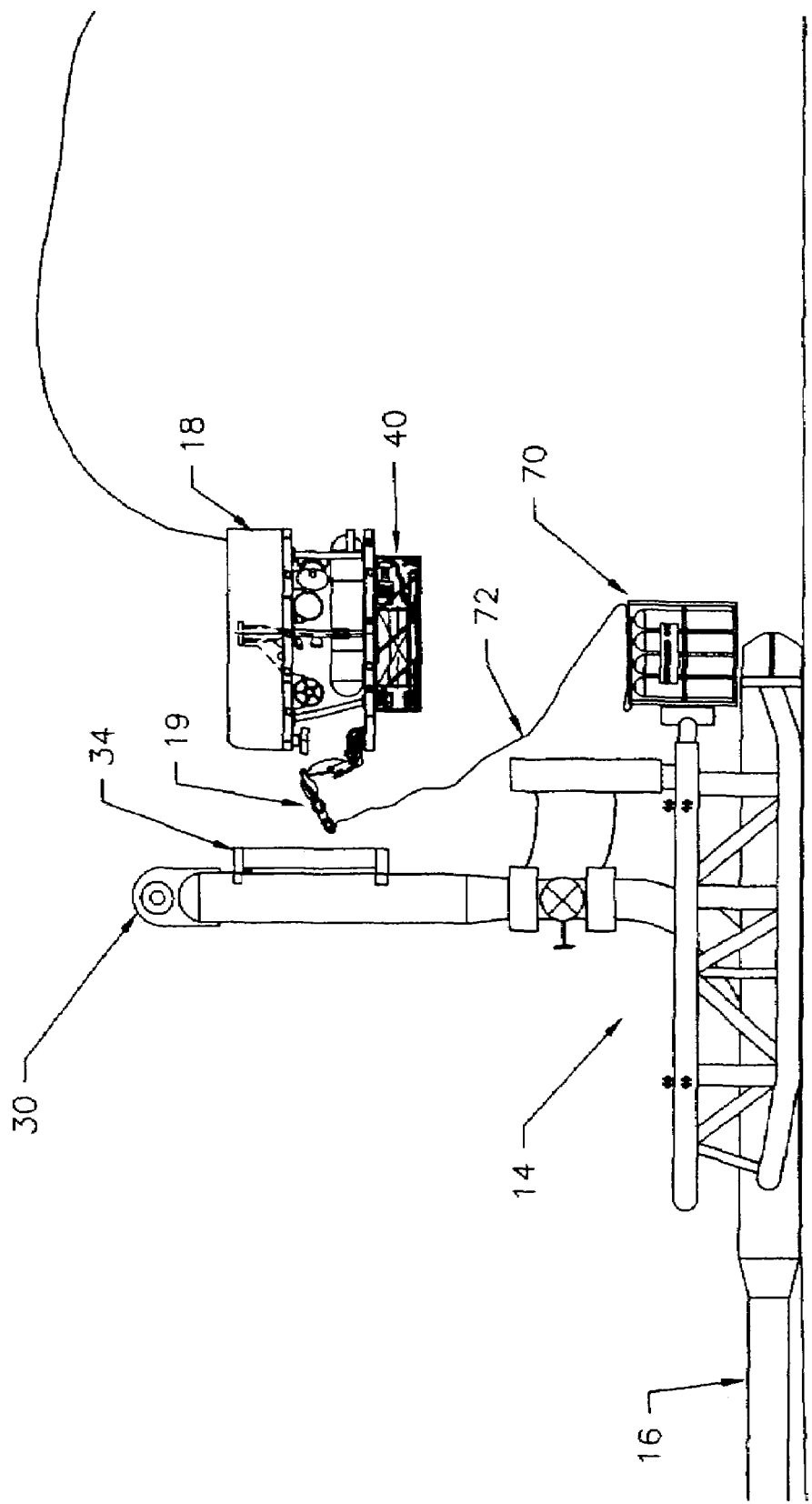

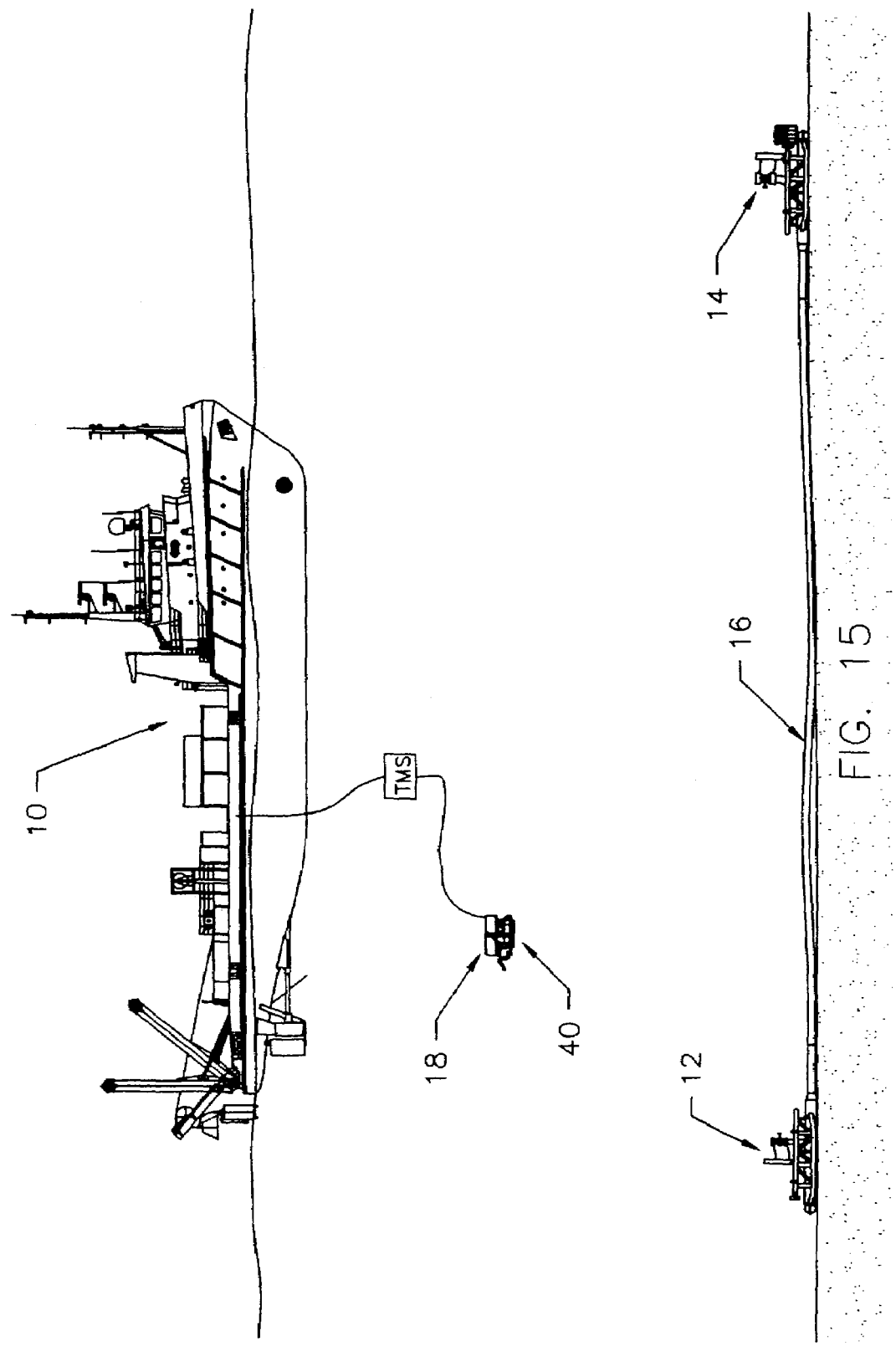

SUBSEA VEHICLE ASSISTED PIPELINE COMMISSIONING METHOD

RELATED APPLICATION

This application is a divisional application of Ser. No. 09/892,314, filed Jun. 26, 2001, entitled "Subsea Vehicle Assisted Pipeline Commissioning Method", now U.S. 6,539,778, based on provisional application 60/275,215, filed Mar, 13, 2001, entitled "Subsea to Subsea Remotely Operated Vehicle Assisted Pipeline Commissioning Method".

FIELD OF THE INVENTION

The present invention is directed to commissioning methods for subsea pipelines. More specifically, the present invention is directed to a commissioning method wherein the operation is carried out on the seabed rather than at the surface.

BACKGROUND OF THE INVENTION

U.S. Pat. No. 5,883,303 discloses and describes an apparatus and method for pigging, flooding and pressure testing pipelines.

The above patent is directed to the testing required when a new pipeline is placed in operation. However, when commissioning a subsea pipeline, or adding a new segment to an existing offshore pipeline, it is often desired to follow the hydrostatic pressure testing with an inert gas or specified medium to purge/dewater the subsea pipeline, and/or inject specified chemicals, to dry the inside of the line before flow of the oil/gas in the pipeline.

The dewatering of a subsea pipeline by the prior art has been at surface level, usually on a surface vessel, boat, structure or platform. This requires that long lines of coiled tubing, hose, or pipe, be used. The prior art method uses large distances of coiled tubing, hose, or pipe, to connect the pipeline to a pump mobilized on the deck of a support vessel to remove the water and dry the line before product is allowed to pass through the line. Also required by the prior art method are large pumps, compressors, compressor boosters and surface support vessel and/or vessels, to support the large volume of compressed gases and fluids pumped through the significant distances to fill the new portion of the pipeline with the gas and fluids.

The method of the present invention eliminates the larger volume of compressed gas and fluids, the higher pressure of the compressed gas and fluids, the large pumps/compressors, compressor boosters, long distances of coiled tubing/hose/pipe, and substantial surface support vessel/vessels, all required by the prior art methods.

SUMMARY OF THE INVENTION

The present invention is directed to a method for completing the commissioning of a subsea pipeline by purging with a compressed gas to dewater and dry the line wherein the operation is done on the seabed. More specifically, the method is carried out with a subsea vechicle (hereinafter "SV") that powers pumps located on the seabed or that are carried by the SV to inject/remove chemical, dewater, and dry, the pipeline. The present invention may be part of the commissioning of a new or old pipeline or a new portion of a pipeline in which a purging of the line with a compressed gas and drying of the line is required. After commissioning, product flows through the pipeline.

BRIEF DESCRIPTION OF THE DRAWINGS

FIG. 3 is a view of one possible panel face connected to the subsea pig launcher/receiver and a representative schematic of the valves included in the panel for carrying out a commissioning method;

FIG. 14 is a schematic of the SV at one subsea pig launcher/receiver to disconnect the compressed gas source after filling the pipeline with gas; and FIG. 15 is a schematic of the completed dewatered pipeline and the recovery of the SV and other equipment as required, to the support vessel.

BRIEF DESCRIPTION OF THE PREFERRED EMBODIMENTS OF THE PRESENT INVENTION

Offshore drilling for oil/gas is continuing to expand at further distances from shore and at greater depths. Subsea pipelines are utilized to transport the discovered product to a variety of disposition points. These points include existing or new offshore trees, manifolds, pipelines, platforms, or onshore facilities. As new wells are completed subsea pipelines flowing the product are tied through manifolds to existing pipelines that are already in place to bring the product to shore. As dictated by law, the new sections of pipeline require hydrotesting to make certain that the line has no leaks and in some cases, contains no water. In addition to hydrotesting, other steps in the commissioning of the pipeline may be required, including dewatering, drying, cleaning, and installing chemicals. The present invention relates to any or all the steps as related to the commissioning of these subsea pipelines carried out on the seabed rather than at the surface.

Once a well is completed, a pipeline is connected to the well for moving the product to shore. The pipeline is often not extended all the way to shore but is tied through a manifold or connection to offshore facilities. Manifolds as used herein may have a variety of specific structures; however, the common function for the purpose herein is that sections of pipelines are connected to other facilities, including other pipelines via various connection assemblies referred to herein as manifolds. Also common to a manifold as used herein is that there is structure to provide internal access to the pipeline. The subsea performance or operation of the commissioning method, the present invention, will be described as a method of commissioning a pipeline between two manifolds; however, it is understood that the commissioning is not limited to that portion of a pipeline between two manifolds but includes any subsea pipeline or pipeline segment, most particularly one which has or could have both ends at the seafloor at the time of testing and commissioning The present invention is directed to a commissioning method wherein the operation is carried out on the seabed rather than at the surface. It is illustrated by using a subsea vehicle to assist in the operation and assumes that valves require to be mechanically operated from the subsea vehicle. This is only one embodiment of the invention since the degree of assistance necessary by the subsea vehicle may be materially reduced with the use of automated valves not requiring mechanical operation. The subsea vehicle need not carry the pumps are other equipment as shown in the embodiment illustrated by the drawings.

Figure 1:
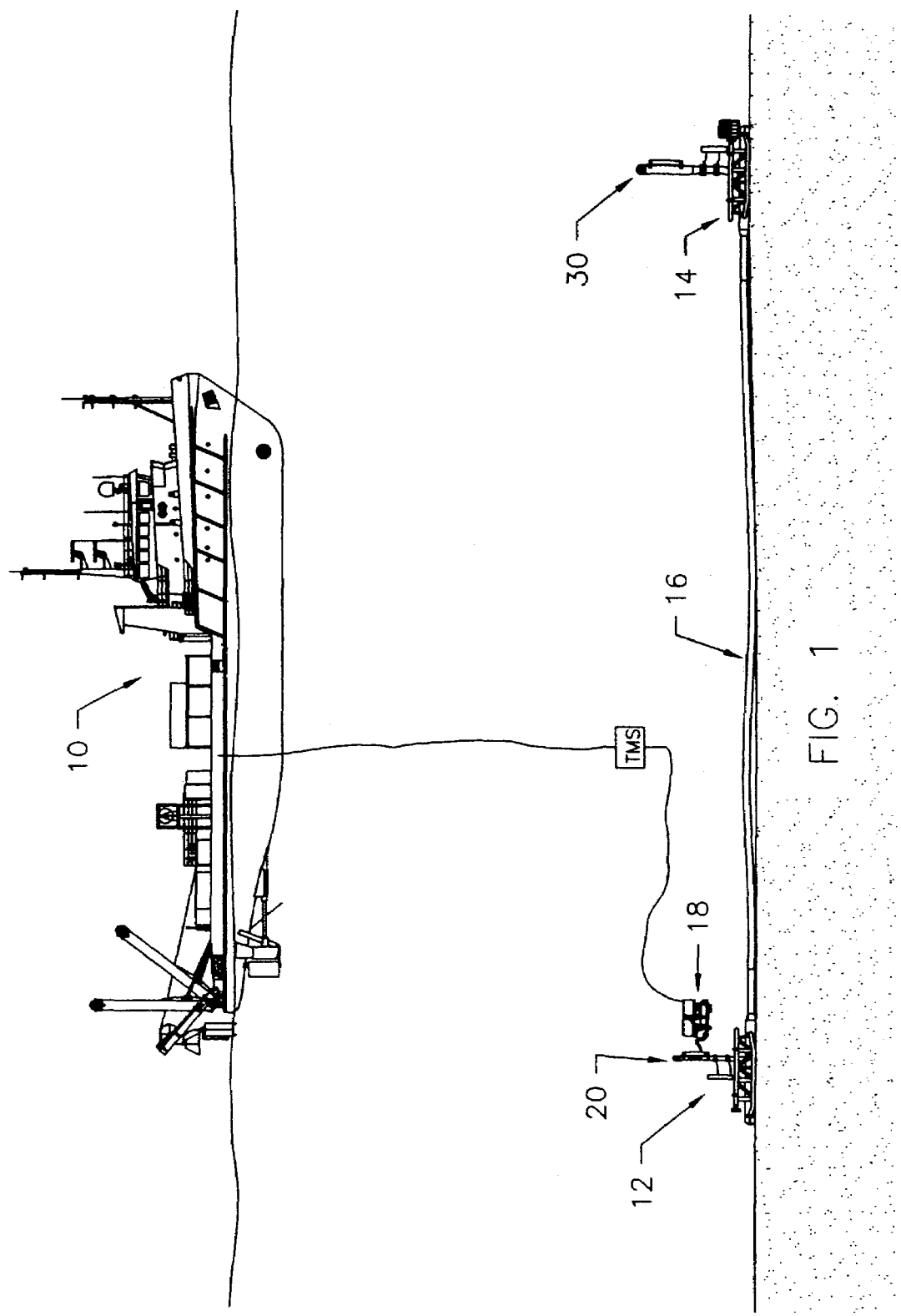
FIG. 1 is a schematic view of a surface support vessel positioned to serve a subsea pig launcher/receiver on a manifold on the seabed and a subsea pig launcher/receiver on a second manifold connected by a portion of a subsea pipeline.

Referring to FIG. 1, a surface support vessel (or multiple vessels if required) 10 is positioned at the surface between two manifolds 12 and 14. A subsea pipeline 16 is connected to the manifolds 12 and 14. The vessel 10 supports the commissioning (the internal cleaning of the pipeline, the hydrostatic testing for leaks and the removal of water and the partial product fill) of pipeline 16 before product is allowed to transported by pipeline 16 for passage to shore. The commissioning process is assisted by a subsea vehicle (SV) 18. The SV may be a remotely operated vehicle (ROV) or autonomous underwater vehicle (AUV) as these vehicles are known in the prior art, or they may be modified for the purposes of the present invention, or may include any manned or unmanned vehicle that has a system that can manipulate the hoses, pumps and other equipment used in the commissioning method. The SV 18 may be tethered to the support vessel 10 and may have a tether management system (TMS) assuring that the tether is not in the way of any operation. The SV 18 provides the electrical system for it's operation and other equipment, as will be described hereinafter. Alternatively, an electrical umbilical cord may be part of the tether and tether system. The SV 18 installs, by use of it's robotic arm 19, a subsea pig launcher/receiver 20 on manifold 12 (it being understood that the direction of operation is not material and the launcher/receiver may be placed on manifold 14). In an equally desirable embodiment, the pig launcher/receiver may be installed on the pipe end and laid with the pipe at the time the pipeline is laid. The pig launcher/receiver 20 is shown as stabbed into the top of manifold 12; however, pig launcher/receiver 20 may be in any orientation. The SV 18 then installs a subsea pig launcher/receiver 30 on manifold 14. Similarly, this assembly may also be installed on the pipe end before the pipe is laid, and then laid with the pipeline. Pig launcher/receiver 20 is installed with a pig 22, which is a known structure used in cleaning or maintaining fluids separate in a pipeline, in the launcher/receiver 20 (see FIG. 2). Pig launcher/receiver 20 and pig receiver 30 can each have a panel 24 and 34, respectively, that is operated by the robotic arm 19 (see FIG. 2) on the SV 18. Pig launcher/receiver 20 and receiver 30 may already be installed or may have been installed as part of the pipeline installation.

The SV 18 returns to the support vessel, (if required), 10 after completing the installation of the pig launcher/receiver 20 and the pig receiver 30 to acquire a fill and test package 40 which includes a number of pumps and lines that are connected to either panel 24 or 34 as will be described in more detail hereinafter. The package 40 is preferably held by the SV 18 during the remainder of the commissioning process; however, landing the package 40 on the sea floor near pig launcher/receiver 20 is also an alternative. The fill and test package 40 may alternatively be more than one package mounted on different skids.

Figure 2:
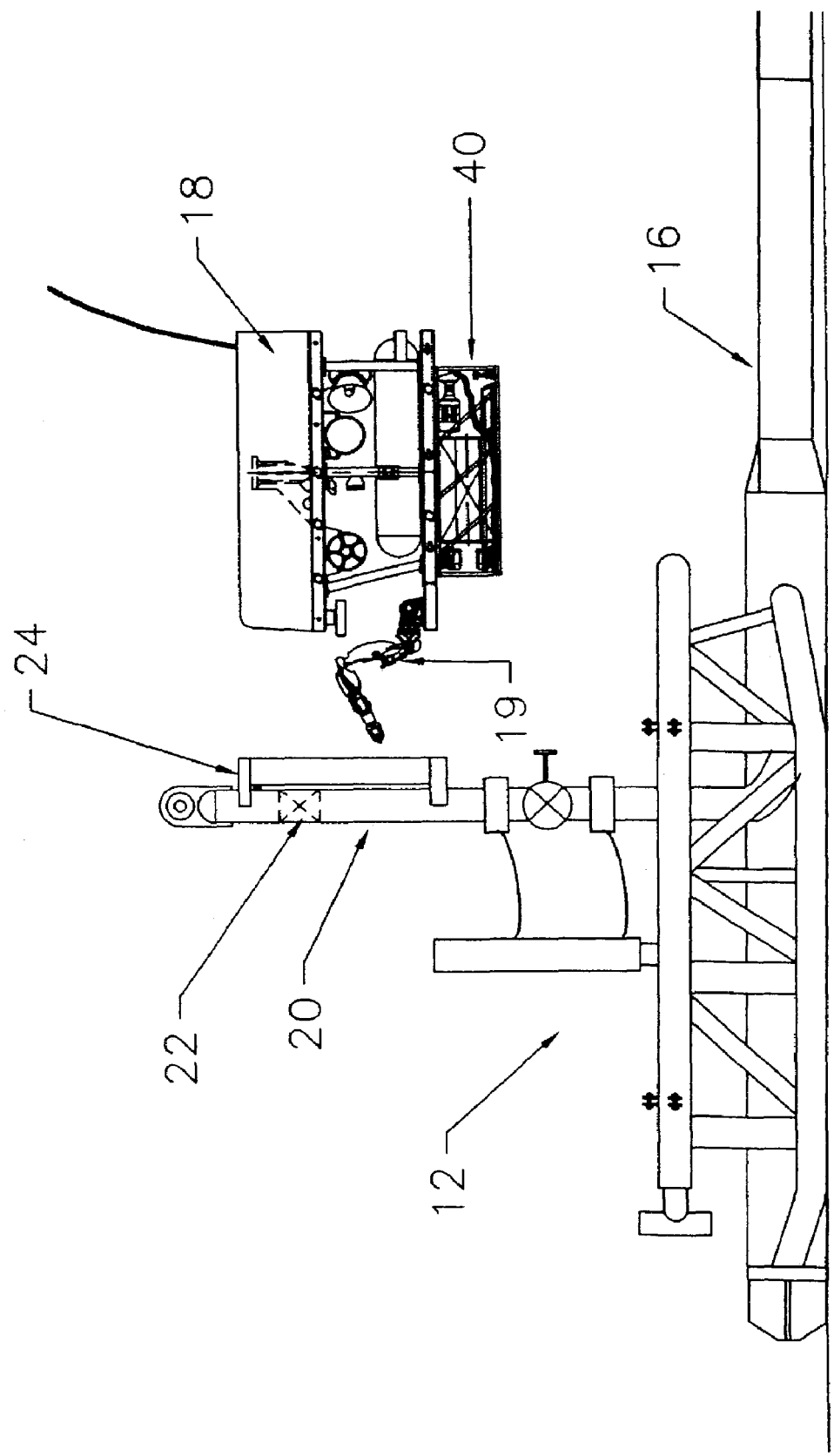
FIG. 2 is a schematic view of a subsea pig launcher/receiver stabbed into a manifold on the seabed and a SV carrying a fill and test package of equipment to carry out a commissioning method.

Referring now to FIG. 2, manifold 12 is at one end of pipeline 16 and may have one or more other pipelines connected at manifold 12. The subsea pig launcher/receiver 20 is connected to the manifold in any orientation that allows access to pipeline 16. A pig 22 is in the pig launcher/receiver 20. A panel 24 (see FIG. 3) on pig launcher/receiver 20 contains passageways, valves and gauges to control the flow of fluids and gasses through pipeline 16. The robotic arm 19 on the SV 18, or other suitable control provision, begins the flow of water behind pig 22 by opening free flooding valve 51 to force the pig 22 through pipeline 16 to clean any solid debris that remains in the pipeline after being laid in place. Upon opening valve 51 in panel 24, seawater enters through opening 52 of a filter 54, where the seawater is filtered and chemical may be injected, and passes through panel 24 and out opening 55 before pushing pig 22 through pipeline 16 until the pressure on either side of the pig equalizes. A check valve (not shown) on the pig receiver 30 allows the air in front of the pig to exit the receiver side of the pipeline 16. The SV 18 then moves to the pig receiver 30.

Figure 4:
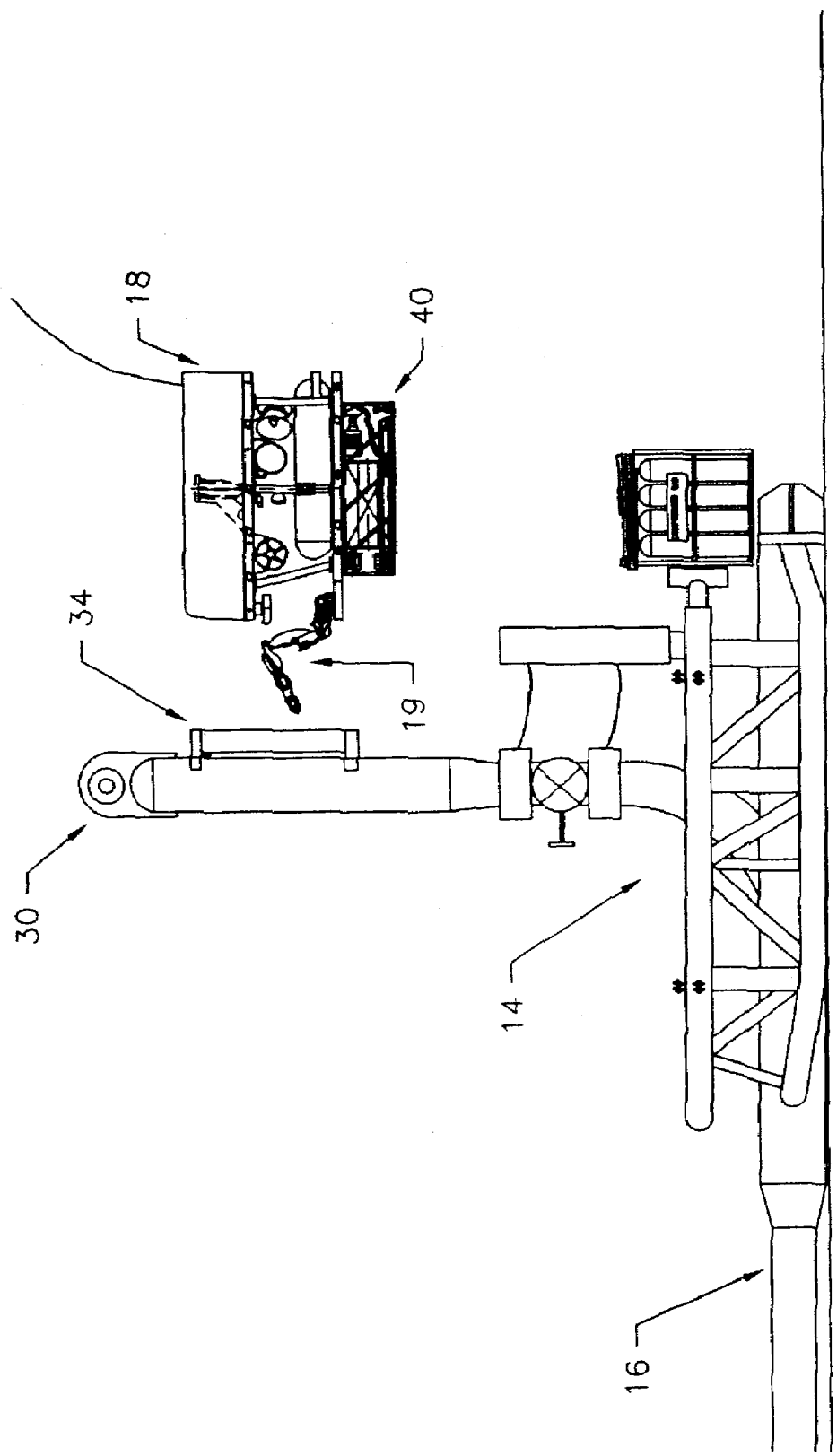
FIG. 4 is a schematic view of a subsea pig launcher/receiver stabbed into a manifold on the seabed and assisted by a SV.
Figure 5:
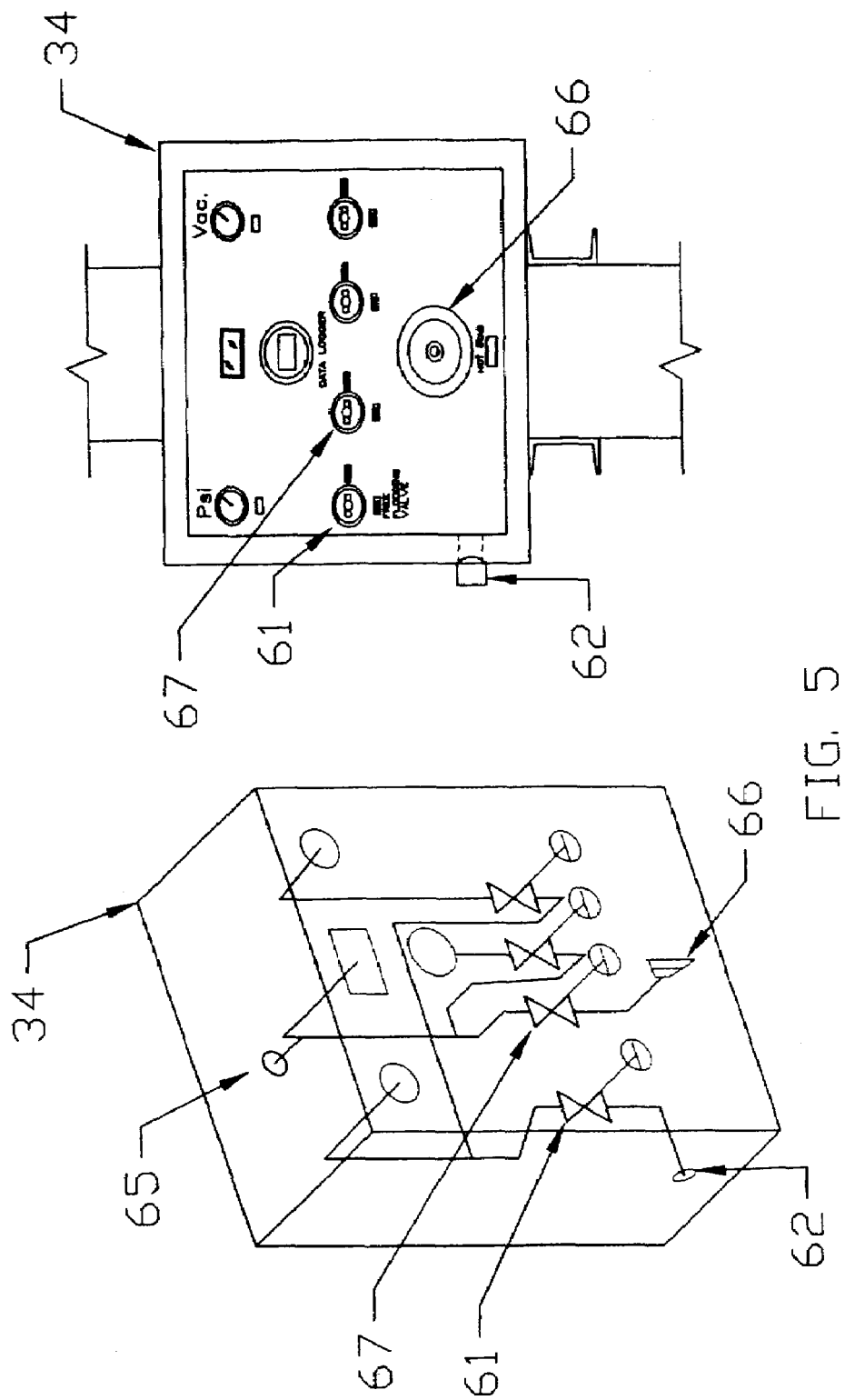
FIG. 5 is a view of one possible panel face connected to the subsea pig launcher/receiver and a representative schematic of the valves included in the panel for carrying out a commissioning method.

Referring now to FIG. 4, manifold 14 may have a vertical section to which the subsea pig receiver 30 is connected so as to have access to pipeline 16. A panel 34 (see FIG. 5) on pig receiver 30 contains passageways, valves and gauges to control the flow of fluids through pipeline 16. The SV 18 opens the discharge valve 61 of panel 34. It is recognized that the method described assumes that each panel 24 and 34 requires the assistance of the SV 18 to open and close the valves; however, if the valves on either panel are automated and are operated from the surface or the SV 18, then the SV need not make trips from the pig launcher/receiver 20 to the pig receiver 30 as described. The SV 18 then moves to the pig launcher/receiver 20. It is recognized that the specific sequence of events will depend upon the requirements of specific applications, and that the sequence stated here is representative but is not the only method in which the described system may be operated.

Figure 6:
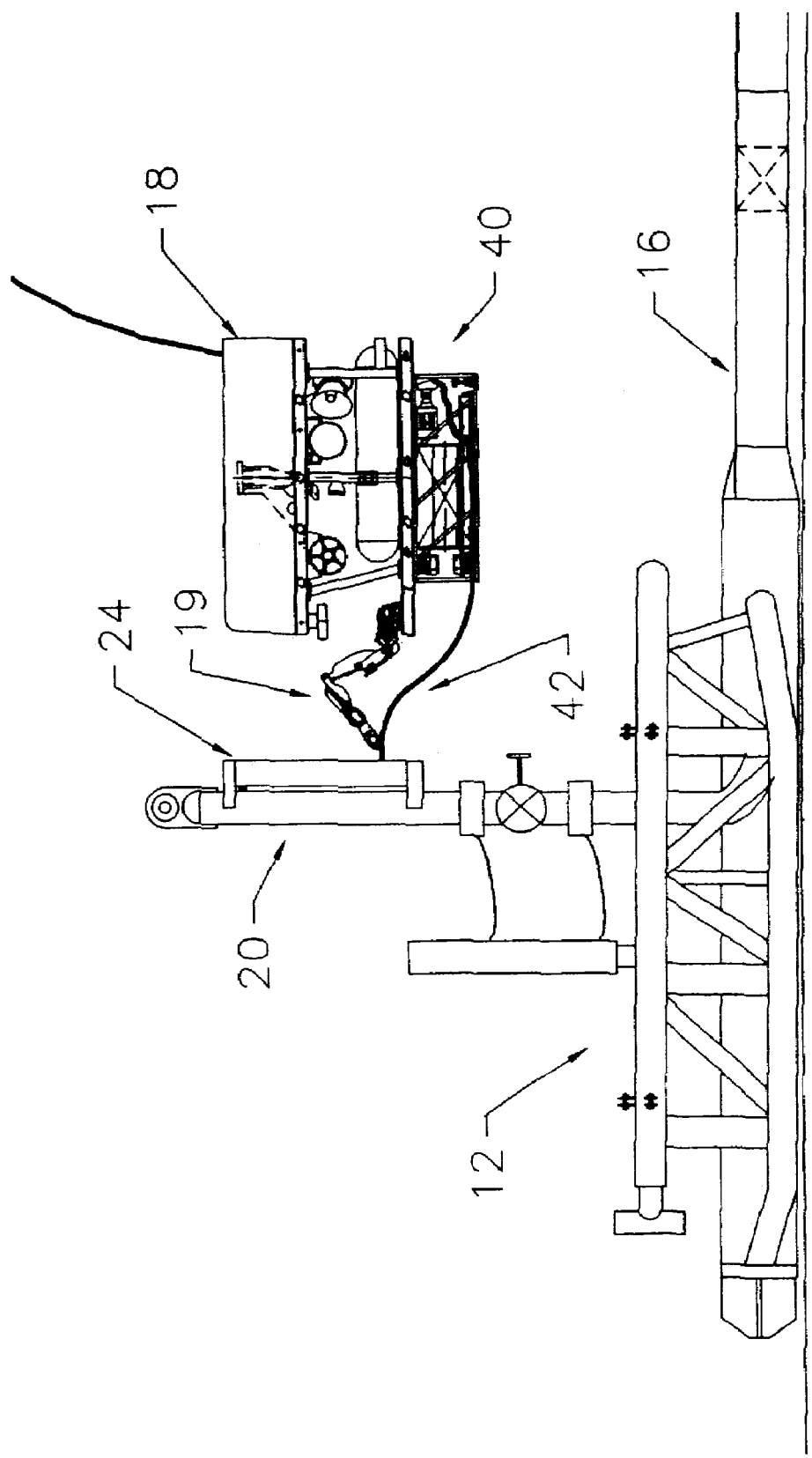
FIG. 6 is a representative schematic view of the pump of the fill and test package of equipment connected at one subsea pig launcher/receiver pushing the pig through the pipeline to the subsea pig launcher/receiver at the other end of the pipeline.

Referring to FIG. 6, the SV 18 then closes free flowing valve 51 on the panel 24. A line 42 from the fill and test package 40, specifically from a high volume pump, is connected to port 56 on the panel 24 and valve 57 is opened. Seawater is pumped through line 42 and the panel 24 and out opening 55 to force pig 22 toward the pig receiver 30.

Figure 7:
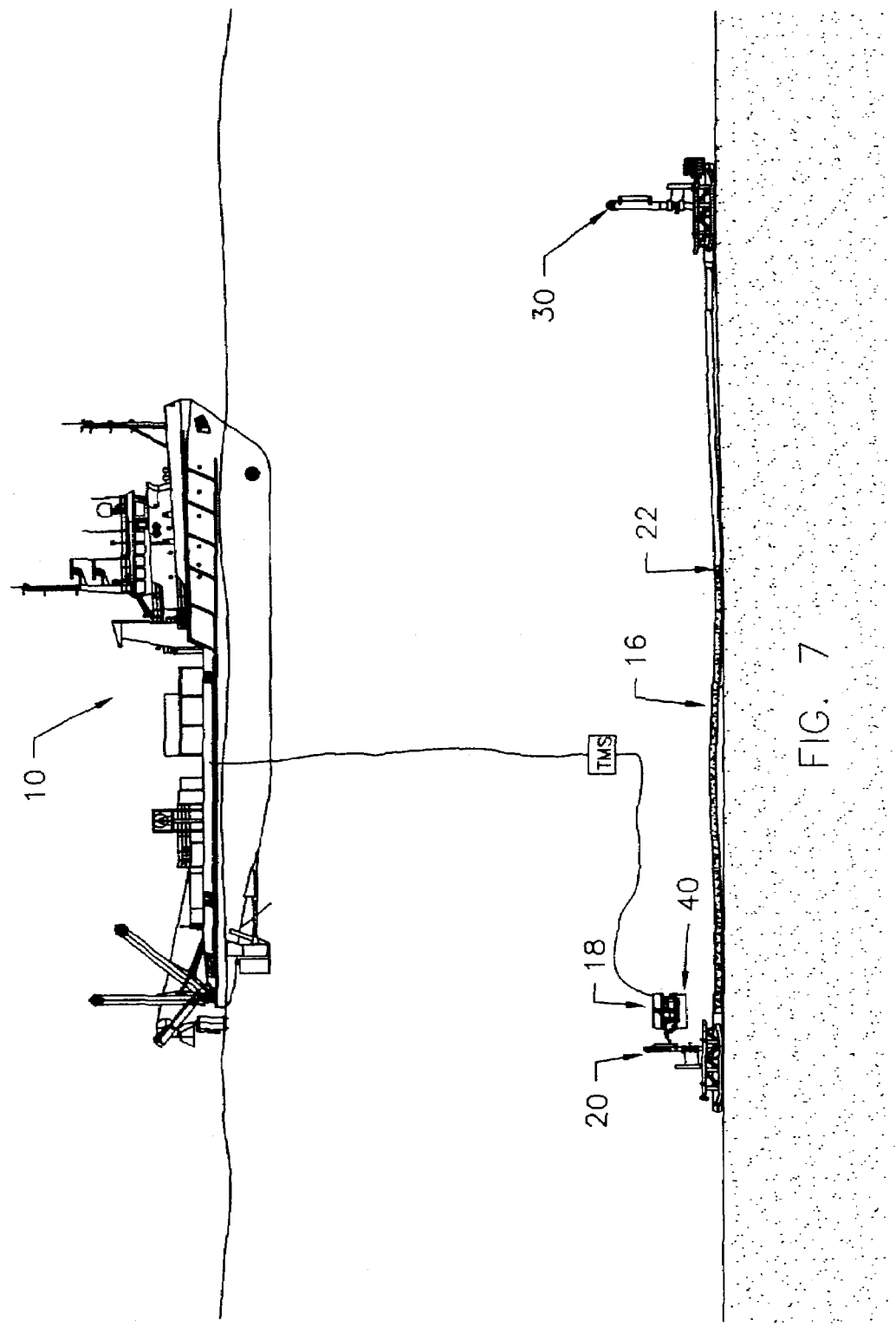
FIG. 7 is a schematic of the SV tethered from the support vessel and powering the pump to push the pig through the subsea pipeline to a subsea pig launcher/receiver.

The operation of filling the pipeline 16 with seawater pumped from pig launcher/receiver 20 to pig receiver 30 is illustrated in FIG. 7. An aspect of the present invention is that the pumping is done from the fill and testing package 40 held by SV 18, or placed on the seabed, rather than pumps mobilized on board the surface support vessel 10 Thus, the entire operation is done subsea rather than using the long lines and large equipment that is necessary if done on the surface. The umbilical for the SV 18 may be thousands of feet long and the subsea operation of the present invention eliminates those number of feet of coiled tubing usually used in this operation. Pumping is continued until the pig 22 arrives in the pig receiver 30. Arrival of the pig at the receiver is detected by any of a variety of pig detectors commonly known in the industry, and an indication of arrival can be sensed from pressure changes or transients at the launcher/receiver. The SV 18 then moves to the pig receiver 30.

Figure 8:
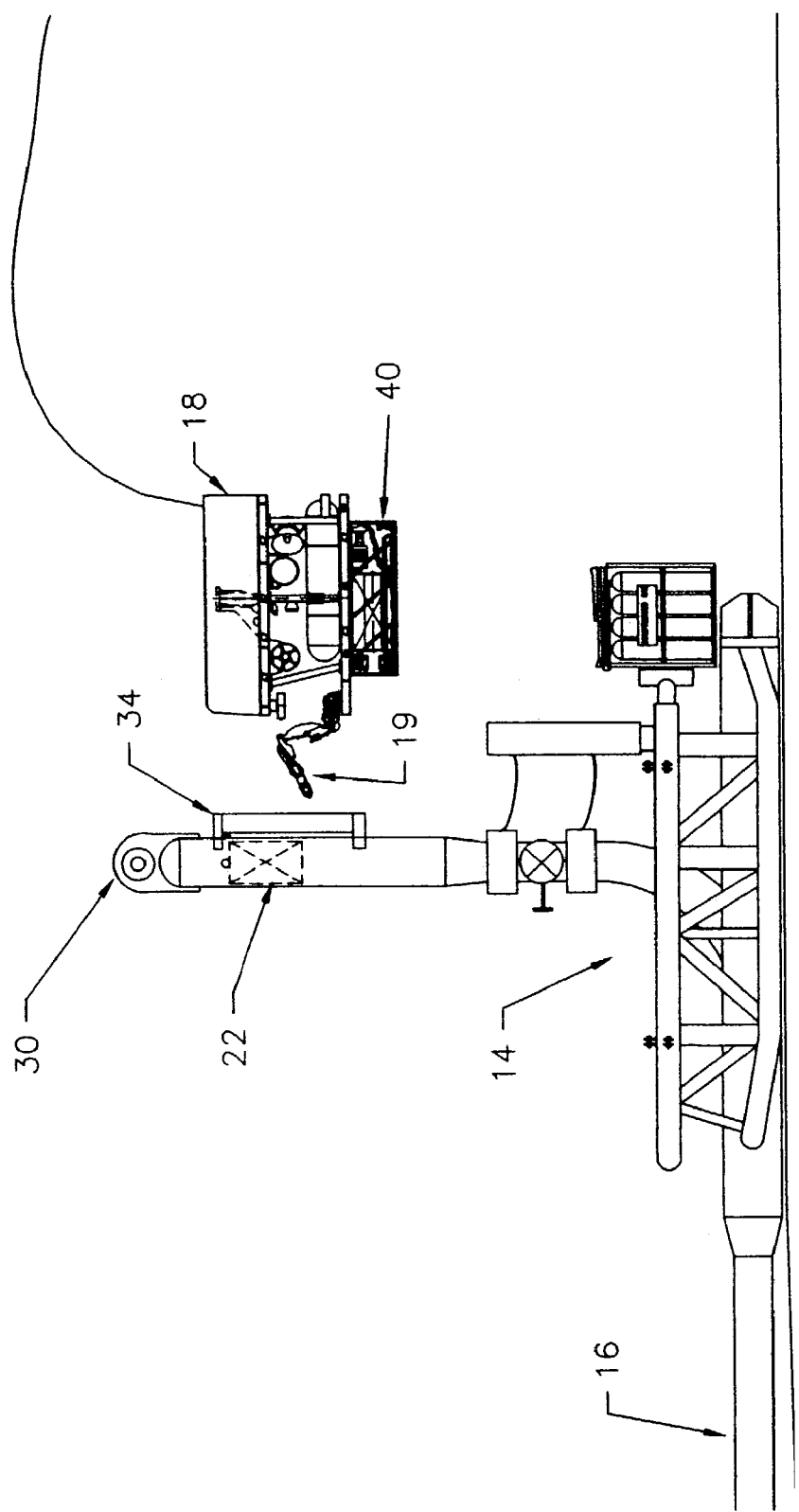
FIG. 8 is a representative schematic of the subsea pig launcher/receiver where the pig has arrived in the receiver.

Referring now to FIG. 8, the SV 18 positioned at the pig receiver 30 closes valve 61 on panel 34 in preparation for the hydrostatic testing of pipeline 16. The SV 18 then moves to the pig launcher/receiver 20.

Figure 9:
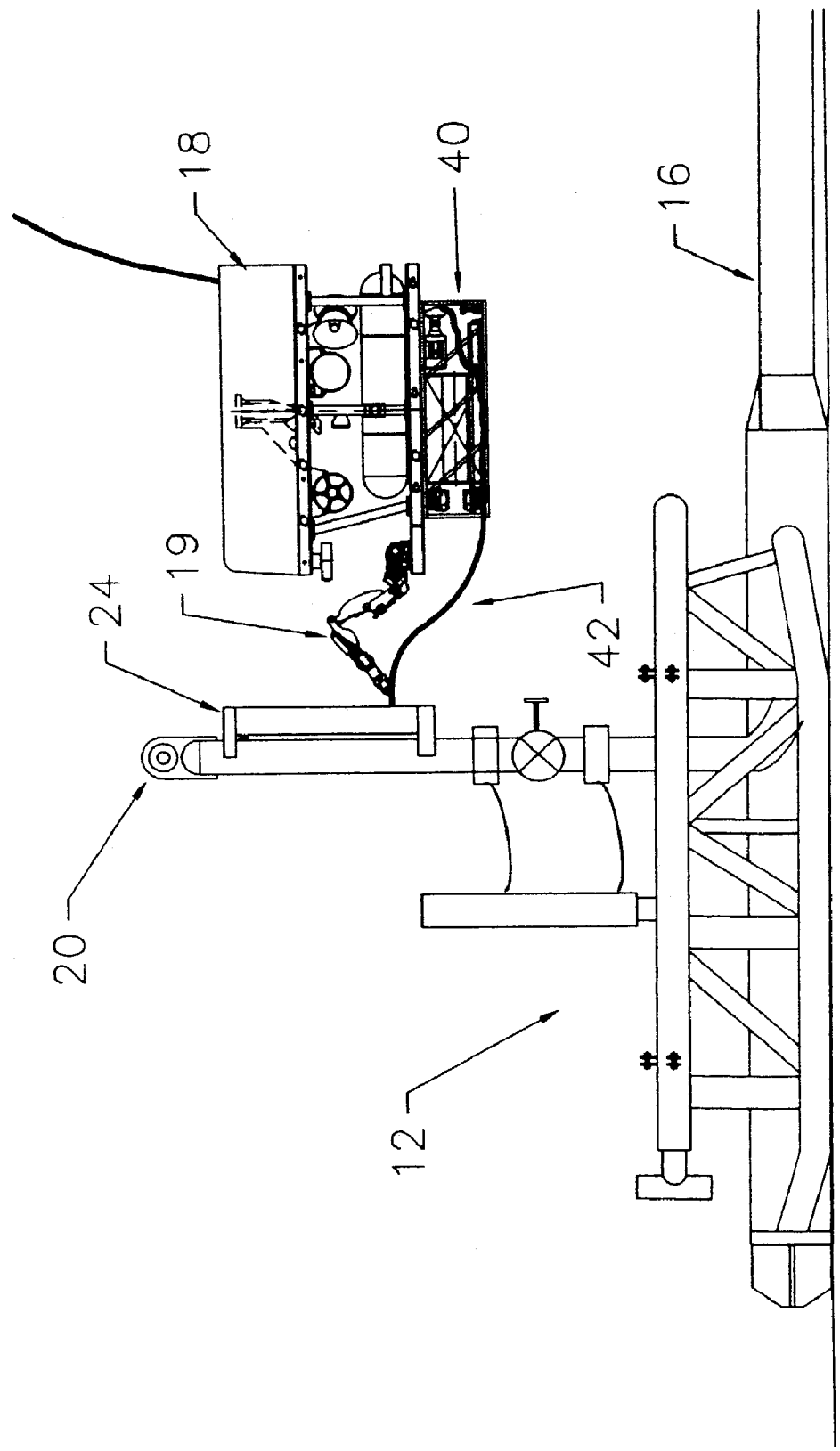
FIG. 9 is a representative schematic of the SV attaching the pressure pump to asubsea pig launcher/receiver to perform a high-pressure hydrostatic test on the pipeline.

Referring now to FIG. 9, SV 18 uses robotic arm 19 to stab line 42 from the fill and test package 40, specifically from a high pressure pump, into the hot stab 56 on the panel 24 and valves 57 and 60 are opened. It is recognized that, depending on the specific application, it may be preferred to perform these steps in a different sequence, and it may be preferred to connect the pump to either the launcher/receiver or receiver end of the pipeline for hydrostatic testing. Seawater is pumped through line 42 to increase the pressure in the pipeline 16 to testing level. The pressure is monitored by pressure gauge 58 and data recorder 63. The test pressure is maintained for a length of time to make certain that there are no leaks in the pipeline 16. Any drop in pressure indicates a problem and the first measure may be to repressure to test pressure and wait another length of time to make certain the pipeline 16 will maintain pressure.

Figure 10:
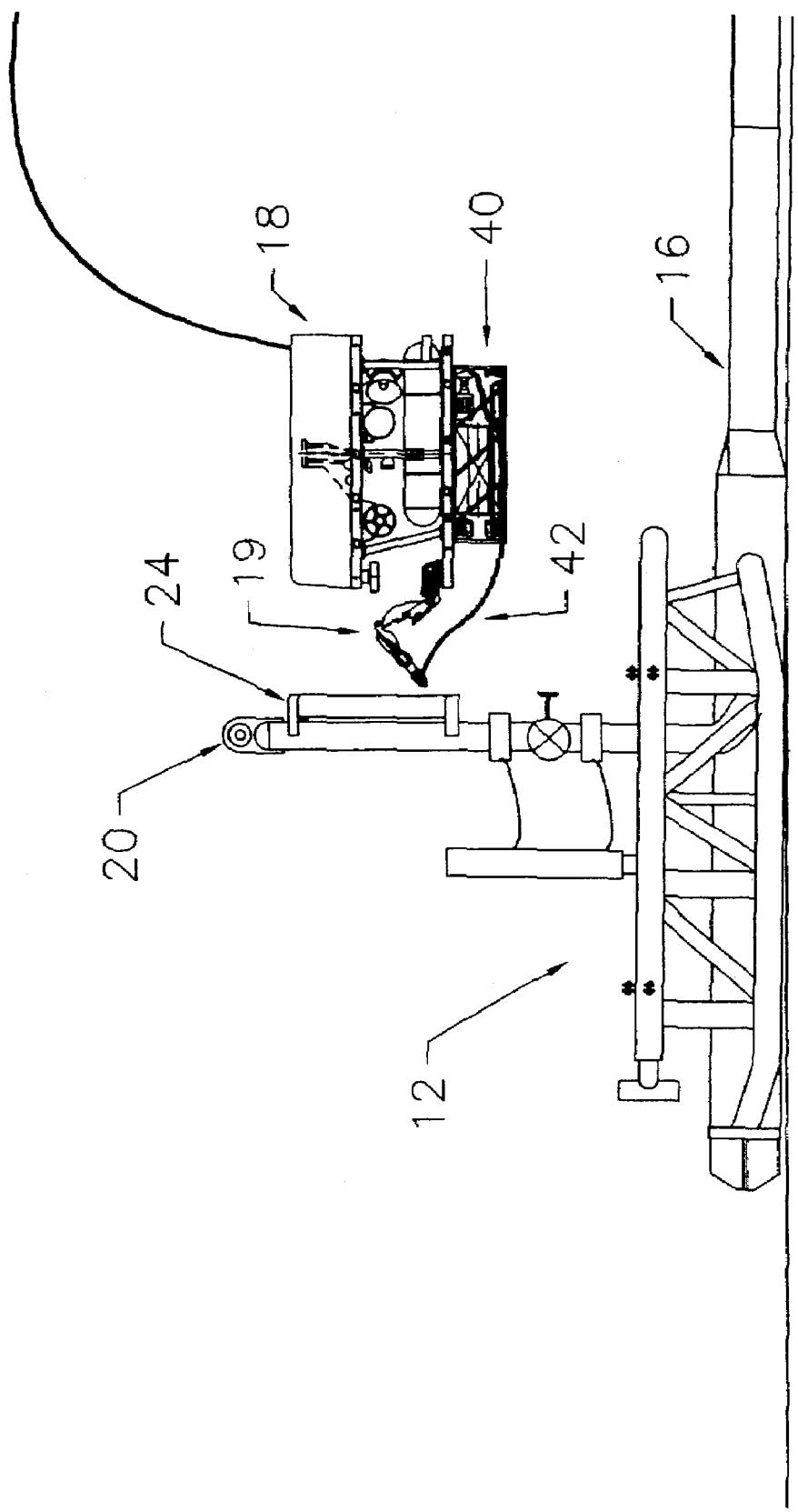
FIG. 10 is a schematic of the SV disconnecting the pressure pump to the subsea pig launcher/receiver after completeing the high-pressure hydostatic commissioning test and opening a valve to release the pressure in the pipeline.

Upon successful completion of the hydrostatic testing of the pipeline 16, the SV 18 disconnects line 42, referring now to FIG. 10, and closes valve 57 and 60 and vents the pipeline through a flow restrictor and/or free flooding valve 51 on the panel to depressure the pipeline 16. The flow of the water in the pipeline 16 will exit through valve 51; however, the flow is controlled and measured by flow meter 59 so that the de-pressurization is slow and even and does not cause any vibrations or other disturbances to the pipeline 16. Monitoring of the pressure gauge 58 and flow meter 59 as the flow of water is through opening 55 and valve 51 is maintained until the internal pressure reaches ambient pressure, meaning that the pressure inside and outside the pipeline 16 are the same. The SV 18 then moves to the pig receiver 30.

Figure 11:
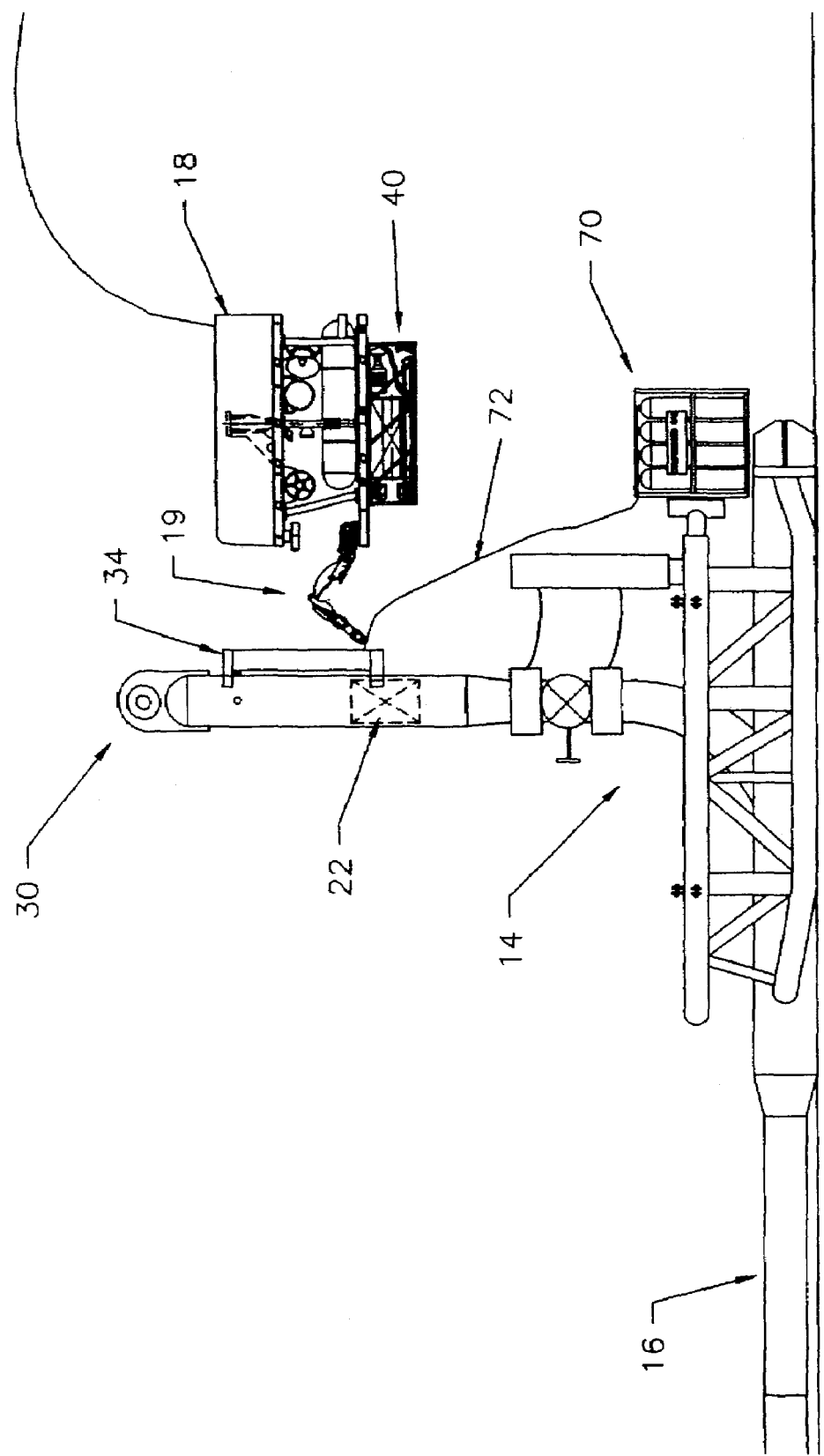
FIG. 11 is a representative schematic of the SV attaching a compressed gas source to one subsea pig launcher/receiver to force the pig through the pipeline from the launcher to the subsea pig receiver.

Referring now to FIG. 11, a compressed gas pack (gas source that may be nitrogen or air) 70, is connected to the pig receiver 30. The gas pack may be mounted to manifold 14, laid on the subsea floor, or connected by a hose/tubing line from a remote site or from the surface previously or at this time in the operation. The connection may be made by any suitable method, including using the robotic arm 19 of the SV 18 to stab the line 72 from the pack 70 into the hot stab 66 in panel 34 and compressed gas inlet valve 67 is opened to force in the compressed gas behind the pig 22. The SV 18 then moves to the pig launcher/receiver 20.

Figure 12:
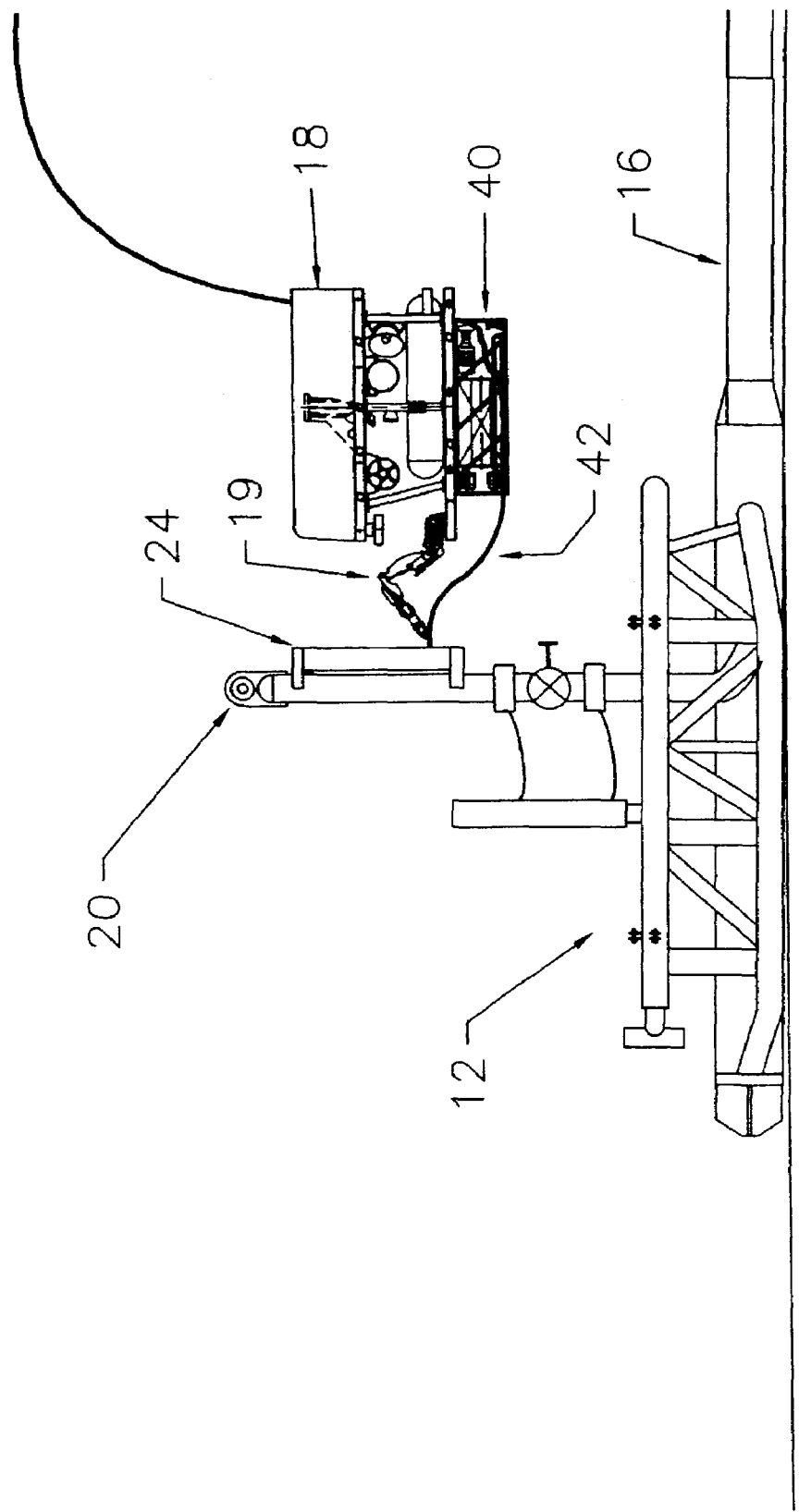
FIG. 12 is a schematic of the SV attaching the dewatering pump and removing the water from the pipeline to move the pig through the pipeline from one pig launcher/receiver to the second subsea pig launcher/receiver.

Referring now to FIG. 12, SV 18 uses robotic arm 19 or other suitable method to connect line 42 from the fill and test package 40, specifically from the dewatering or vacuum pump, into port 56 of the panel 24. The valve 57 is opened and the pipeline 16 is dewatered. Seawater is pumped through opening 55, valve 57 and line 42, reducing the pipeline internal pressure at the launcher/receiver end so that a modest volume of compressed gas can push pig 22 by differential pressure toward the pig launcher/receiver 20.

Figure 13:
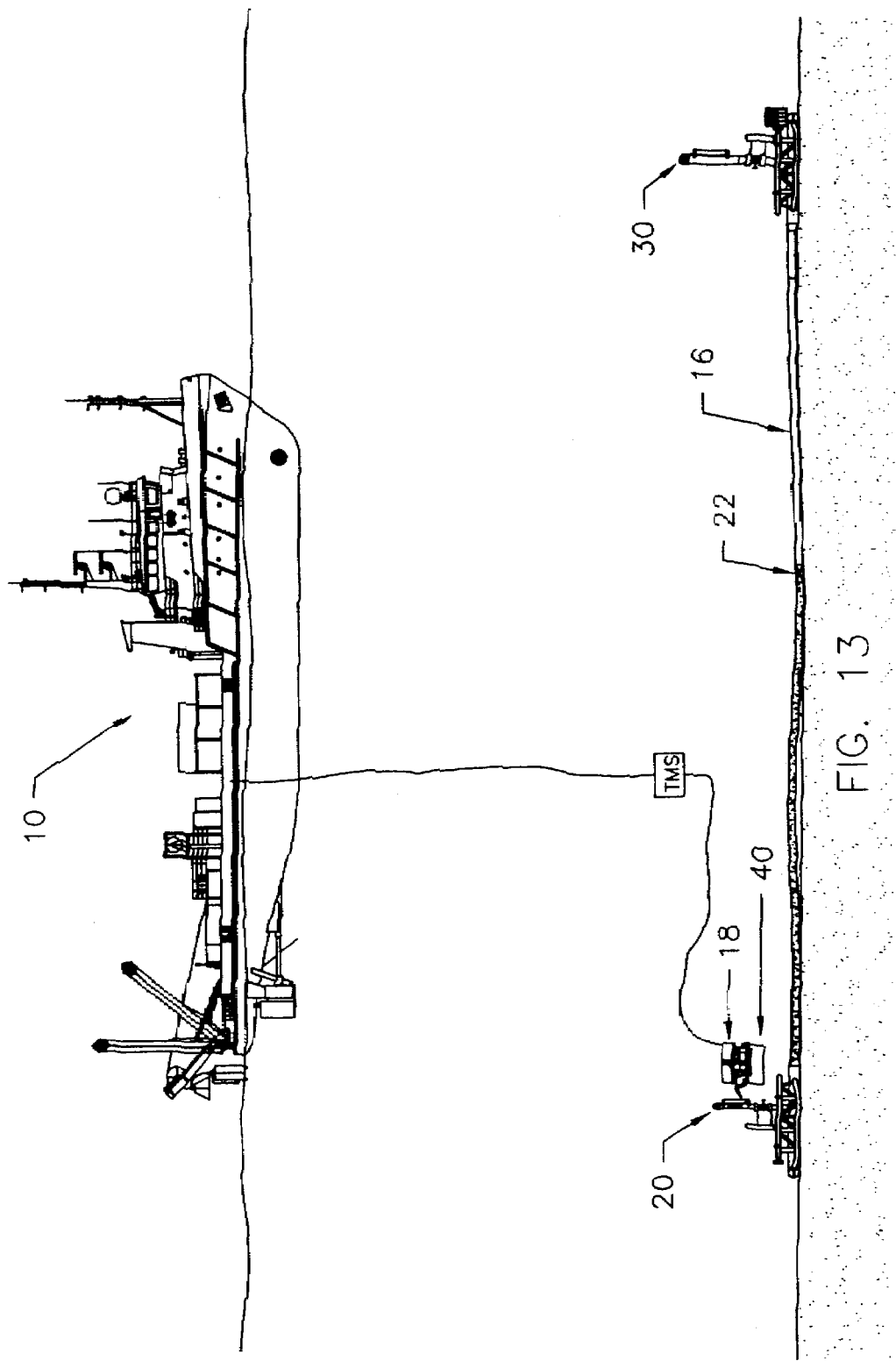
FIG. 13 is a schematic of the SV tethered from the support vessel and powering the pump at one subsea pig launcher/receiver to reduce the pressure on the launcher side of the pig which enables the compressed gas to push the pig toward the receiver.

The operation of dewatering and pigging the pipeline 16 by pumping water through the pig launcher/receiver 20 from pipeline 16 is illustrated in FIG. 13. An aspect of the present invention is that the pumping is done from the fill and test package 40 held by SV 18 rather than pumps mounted on the support vessel 10. The operation being done subsea eliminates the long lengths of coiled tubing, hoses, or piping, and the large pumps that are necessary when the operation is done at the surface. The volume of compressed gas is significantly reduced. Since the gas in the pipeline is at a relatively low pressure, significantly smaller quantity of compressed gas is required as compared to prior art. An additional advantage is that a smaller support vessel may be utilized. The operation of dewatering and pigging, meaning that the water is forced out of pipeline 16 by the pig 22 being pushed by compressed gas, until equilibrium is reached then the pig is drawn to the launcher/receiver by the dewatering pump until the pig 22 arrives at the pig launcher/receiver 20 at which time there is no further water to be sucked out of the pipeline 16. The SV 18 then shuts off the dewatering pump and closes valve 47 on the panel 24. The pipeline 16 is now ready for product to be passed through the pipeline 16. The product will not be contaminated by water and the nitrogen or other compressed gas does not materially affect the product. The SV 18 disengages line 42 and makes any necessary securing of manifold 12 as is deemed necessary or desirable. The SV 18 then moves to the pig launcher/receiver 30.

Referring now to FIG. 14, the SV 18 closes valve 67 and disengages compressed gas line 72 from panel 34. The compressed gas pack 70 is made secure or connected to the SV 18 to be returned to surface. The SV 18 makes any necessary securing of manifold 14 as is deemed necessary or desirable. The commissioning operation that includes cleaning, hydrostatic testing and dewatering is complete. It is understood that all steps are not necessary if the operation includes less than the commissioning operation as set forth. Additionally, an additional step may be included whereby the product is introduced into the pipeline.

Referring now to FIG. 15, the SV 18 carrying the fill and test package 40 is recovered to the support vessel 10.

The commissioning operation has been described in detail, but it is understood that this detail is representative, and that variations in the method may be appropriate for specific applications. Significant improvements to the prior art have been set forth. Modifications and additions may be added without changing the commissioning operation as set forth. For example the commissioning method is carried out on a pipeline with both ends on the seafloor or one end on the seafloor and the operation is carried out at that end before the pipeline is connected to manifolds or other structure. Another example, the panel 24 may have a valve 67 that when open provides access to vacuum gauge 69. The robotic arm 19 and pumps on the fill and test package 40 are powered by electric or hydraulic power. The tether connecting the support vessel 10 includes a substantial electrical source that powers the pumps on the fill and test package 40 directly or powers a hydraulic power source which then drives the pumps. There may be three separate pumps on the fill and test package 40 or two pumps, the low volume high pressure pump being able to operate both to add water to the pipeline 16 or as a dewatering pump to suck water from the pipeline 16, or just one pump. There are many changes in details that may be made such that water treating may be added, filters may be added, more than one pig may be used, methanol or other chemicals may be added between pigs, the pig may include tracking means to name some; however, changes in detail do not change the method as set forth and described.

The invention claimed is:

1. A method of dewatering a pipeline between first and second subsea manifolds, comprising:
    providing a test and fill package operated by a submersible vehicle (SV), the test and fill package having at least one subsea pump dimensioned to remove a volume of water disposed between the first and second subsea manifolds;
    attaching the subsea pump to the first subsea manifold on the pipeline;
    delivering a compressed gas source to the second subsea manifold on the pipeline using the SV, the second subsea manifold having a subsea pig launcher/receiver with a pig therein;
    activating the subsea pump to reduce internal pressure in the pipeline; and
    introducing compressed gas from the compressed gas source to move the pig by differential pressure toward the first subsea manifold, thereby dewatering the pipeline.

2. The method according to claim 1 wherein the SV is tethered to a support vessel on the surface.

3. The method of claim 1, wherein the compressed gas source consists of one or more subsea compressed gas packs.

4. The method of according to claim 1 wherein a pump mounted on the test and fill package pumps water into the pipeline to a level sufficient for hydrostatic pressure testing prior to dewatering the pipeline.

5. The method of claim 4, wherein a single pump on the test and fill package performs both hydrostatic pressure testing and dewatering.

6. The method of claim 4, wherein separate pumps on the test and fill package perform hydrostatic pressure testing and dewatering.

7. A method of dewatering a pipeline between a first and second subsea manifolds comprising:
    connecting a subsea compressed gas pack via a compressed gas inlet valve to a first subsea manifold having a subsea pig launcher/receiver with a pig therein;
    opening the gas inlet value to force the compressed gas behind the pig;
    connecting a pump operated by a submersible vehicle (SV) to the second subsea manifold;
    activating the pump to draw water, the pig and gas delivered from the compressed gas pack through the pipeline, the gas pack having sufficient compressed gas to move the pig from one of the subsea manifolds to the second subsea manifold in conjunction with reduced internal pipeline pressure provided by the pump;
    wherein the action of the pump and the compressed gas provide for dewatering the pipeline without need for a surface pump or a surface supply of compressed gas.

8. A method according to claim 7 wherein the SV has a robotic arm for connecting and disconnecting the pump to the pipeline.

9. The method according to claim 7 wherein the SV is tethered to a support vessel on the surface.

* * * * *